United States Patent [19]

Kim

[11] Patent Number: 5,757,757
[45] Date of Patent: May 26, 1998

[54] OPTICAL PICKUP

[75] Inventor: Young Sik Kim, Seoul, Rep. of Korea

[73] Assignee: LG Electronics Inc., Seoul, Rep. of Korea

[21] Appl. No.: 598,107

[22] Filed: Feb. 7, 1996

[30] Foreign Application Priority Data

Feb. 9, 1995 [KR] Rep. of Korea ............ 2377/1995

[51] Int. Cl.⁶ ............................................. G11B 7/00
[52] U.S. Cl. ................................... 369/112; 369/109
[58] Field of Search ........................... 369/112, 103, 369/109

[56] References Cited

U.S. PATENT DOCUMENTS

| 5,327,413 | 7/1994 | Fritz | 369/112 |
| 5,463,609 | 10/1995 | Inagaki et al. | 369/112 |

FOREIGN PATENT DOCUMENTS 0594193  4/1994  European Pat. Off. .

*Primary Examiner*—Loha Ben

[57] ABSTRACT

An optical pickup is disclosed including a light source, a light incidence part having a first light focusing unit for focusing the light output from the light source, a perpendicular prism having a total reflecting side placed parallel to a writing side of an optical writing medium, a photodetector detecting light reflected from the total reflecting side of the perpendicular prism by a second light focusing means and the photodetecting unit, a first supporting member supporting the light incidence part, the perpendicular prism and the photodetector, and a second supporting member controlling horizontal and vertical positions of the first supporting member to maintain the horizontal and vertical intervals between the perpendicular prism and the optical writing medium.

23 Claims, 5 Drawing Sheets

OPTICAL PICKUP

BACKGROUND OF THE INVENTION

The present invention relates to an optical pickup, and particularly to an optical pickup capable of writing or reading out a signal on/from an optical disk using frustrated internal total reflection.

A conventional optical pickup, as illustrated in FIG. 1, is divided into a laser diode 1 of light source, a branching filter 2 positioned above the upper part of the laser diode 1, an objective lens 3 of a focusing part having a position shifting device 6 on the right and left sides of the objective lens 3, an optical disk 4 positioned above the upper part of the objective lens 3, and a photodetector 5 positioned adjacent to the branching filter 2.

An operation of a conventional optical pickup configured as above is as follows.

A laser beam coming from the laser diode 1 light source passes through the branching filter 2 and is focused at a pit side of the optical disk 4 by the objective lens 3 attached to the position shifting device 6. The focused laser beam is diffracted and reflected by the pit side and the refracted light is incident again upon the objective lens 3. The the re-arrived incidence beam passes through the objective lens 3, and is reflected by the branching filter 2. The reflected beam from the branching filter 2 is focused to the photodetector 5. Which detects an a light amount by a amount of light measuring device 21.

According to the amount of detected light, the position of the objective lens 3 is controlled by a position control device 24 for focusing onto the optical disk 4. The amount of light obtained from the rotating optical disk 4 is transformed into an electrical signal and output as a sound or an image via a signal processing device 22 through a signal outputting device 23. The quantity of light being detected by the photodetector 5 is generated from the phase difference between the diffraction of light by the pit of the optical disk 4 and a depth d of the pit.

When a pit cycle 8 of the optical disk 4 is p, the incident light is a non-diffracted light of zero degree and a diffracted light of a ±1 degree into $\pm\lambda = P(\sin\Theta i + \sin\Theta d)$. In this equation, $\lambda$ is a light wave, $\Theta i$ is an incidence angle, and $\lambda d$ is a diffraction angle. Because there is a phase difference between the beam of 0 degree and the beam of ±1 degree, and the beam of ±1 degree coincides partly with the beam of 0 degree, an interference occurs in this area that varies the amount of light detected.

However, the conventional optical pickup, to read out the signal written in the optical disk with using the diffraction by the pit of the optical disk is not reliable because it has difficulty in reading out a high density signal written on the optical disk.

SUMMARY OF THE INVENTION

An object of the invention is to solve the problems of prior art and to provide an optical pickup which reads a signal written in an optical disk using a frustrated total internal reflection (FTIR). The invention enhances a recording function and reliability by using (FTIR), instead of using diffraction, which facilitates reading an optical disk having a high writing density by easily maintaining a distance between the optical disk and the optical pickup.

To achieve the object, the invention includes a light source, a light incidence part having a first light focusing means for focusing light output from the light source, a perpendicular prism having a total reflecting side placed on a writing side of an optical writing medium in parallel, a photodetector detecting light reflected from the total reflecting side of the perpendicular prism by a second light focusing means and the photodetecting means, a first supporting member supporting the light incidence part, the perpendicular prism and the photodetector, and a second supporting member controlling horizontal and vertical positions of the first supporting member to maintain the horizontal and vertical intervals between the perpendicular prism and the optical writing medium.

BRIEF DESCRIPTION OF THE ATTACHED DRAWINGS

DETAILED DESCRIPTION OF THE INVENTION

Referring to the attached drawings, the preferred embodiments of the invention will be described below.

Figure 1:
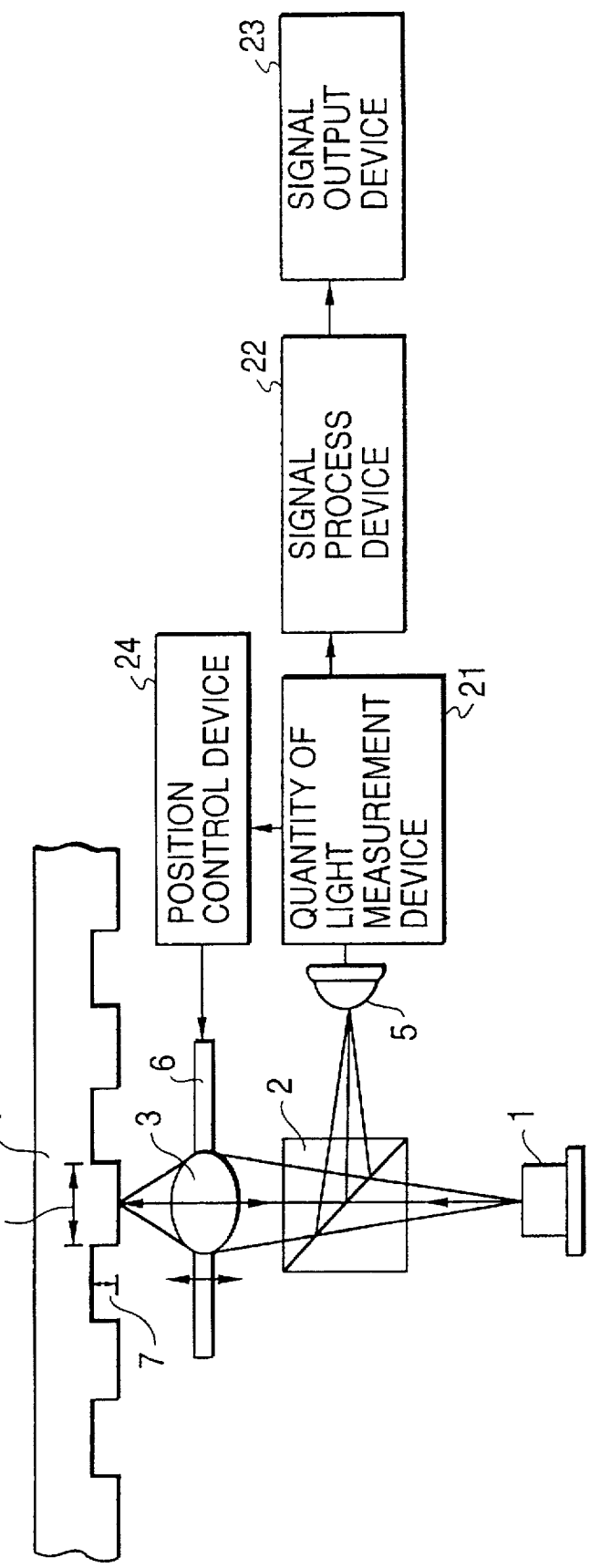
FIG. 1 is a sectional view illustrating a configuration of a conventional optical pickup and a flow of signal thereof.
Figure 2:
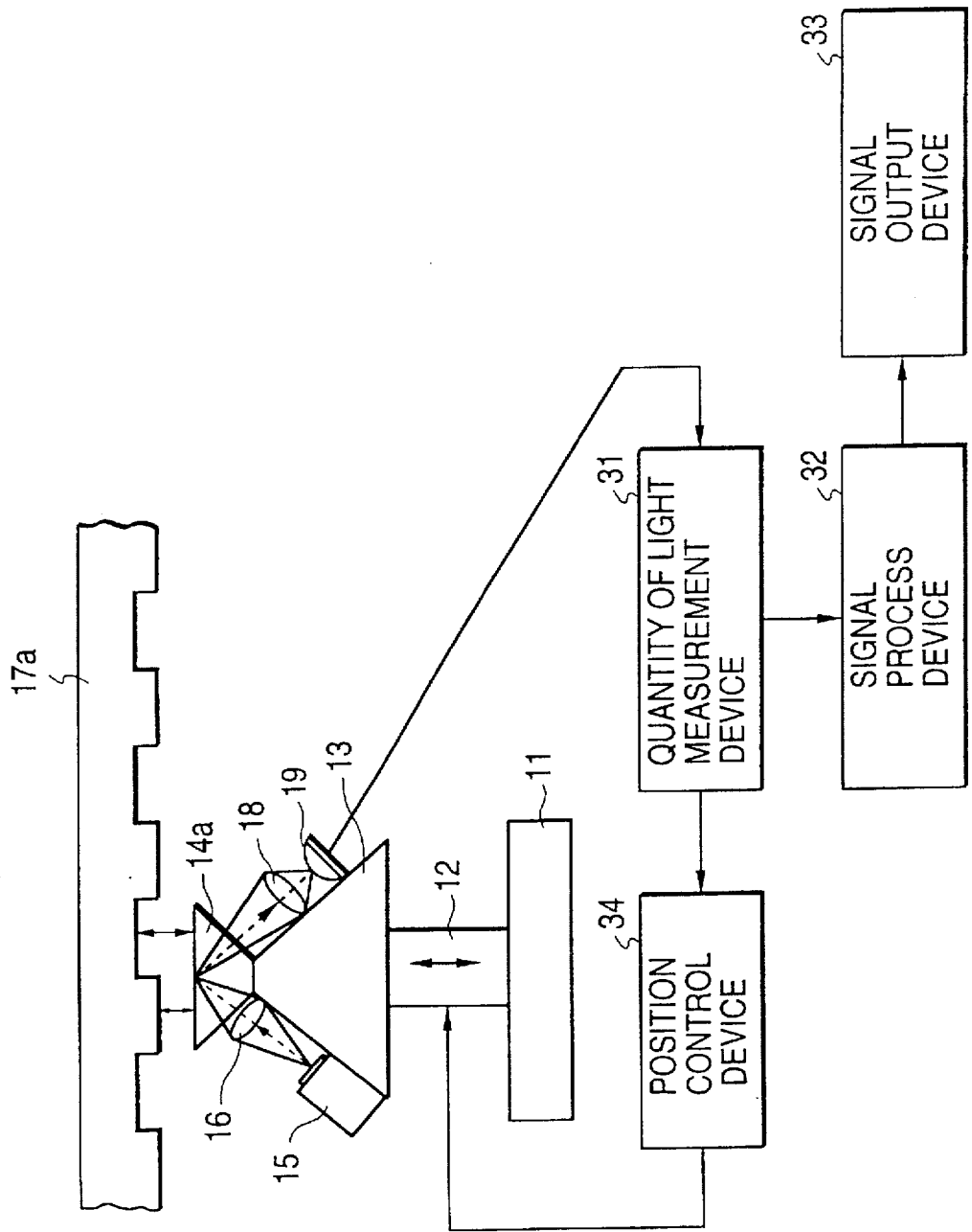
FIG. 2 is a sectional view illustrating a configuration of an optical pickup and a flow of signal thereof according to a first embodiment of the invention.

As illustrated in FIG. 2, an optical pickup of the present invention is formed in such a manner that a position shifting device 12 is attached to the center part of a first supporting member 11 in a vertical direction. A second supporting member 13 having a flat upper part of a triangle type is attached to the upper part of the position shifting device 12. A perpendicular prism 14a, formed in a reverse-triangular shape of 45°–90°–45° in a common connection with the plane face of the second supporting member, is attached on the second supporting member 13. A laser diode 15 of a light source is attached on one side of the sloping face of the second supporting member 13. An objective lens 16 of a first light focusing means for focusing is attached on the sloping face between the laser diode 15 and the perpendicular prism 14a, and a light focusing lens 18 of a second light focusing means is attached on one side of the other sloping face of the second supporting member 13. A photodetector 19 is attached on the sloping face of the second supporting member separately from the second light focusing lens 18 and an optical disk 17a having a pit side arranged above the upper part of the perpendicular prism 14a.

The above-mentioned structure is simply divided into a light incidence part formed of the laser diode 15, an objective lens 16 and a perpendicular prism, a photodetecting part formed of the light focusing lens 18 and the photodetector 19, the first and second supporting members 11 and 13 for supporting and controlling the light incidence part and the photo detecting part, and the position shifting device 12.

Figure 6:
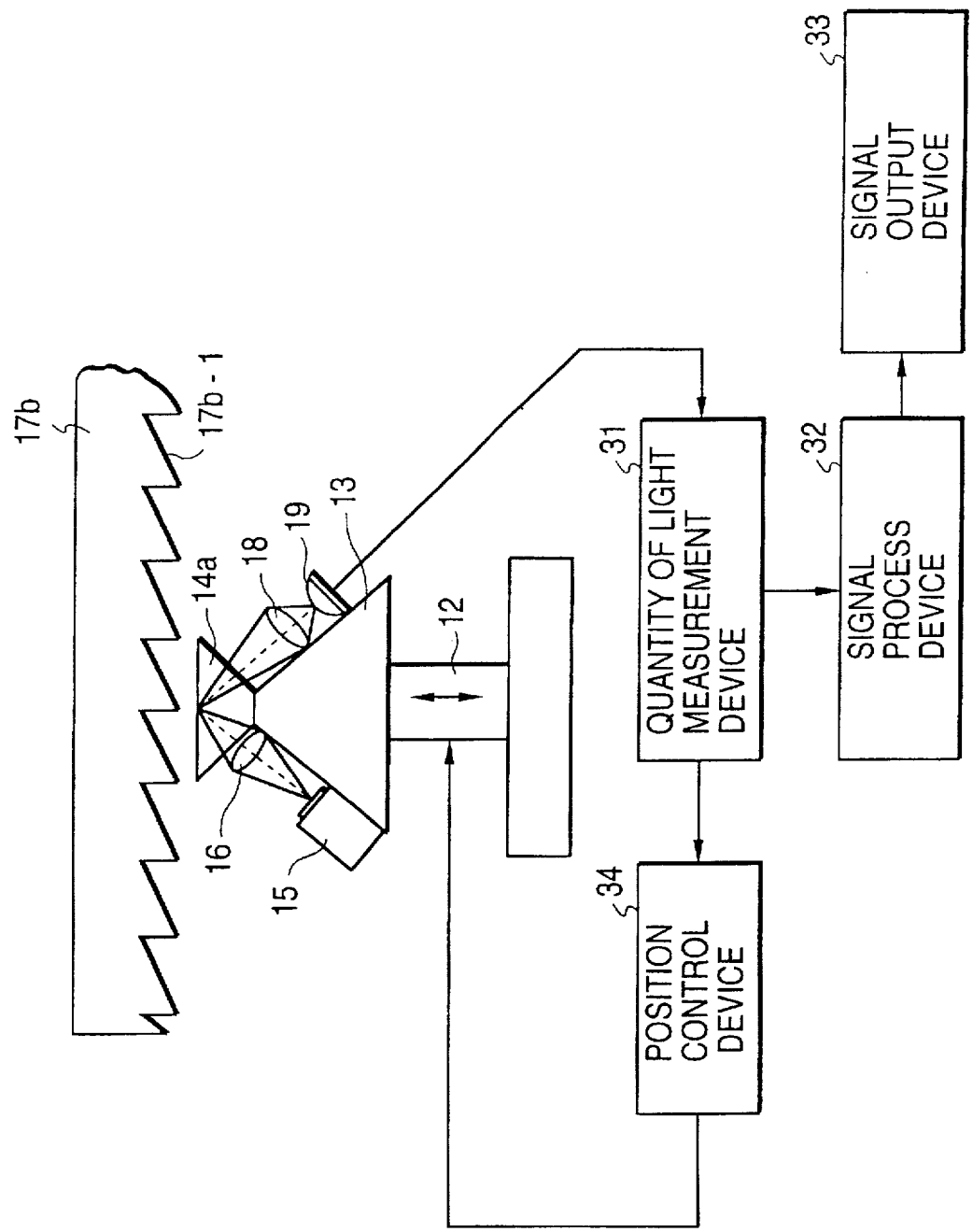
FIG. 6 is a sectional view illustrating a configuration of an optical pickup and a flow of signal thereof according to a second embodiment of the invention.

As illustrated in FIG. 6, the optical disk can be replaced with a denture type optical disk 17b having a tilt face 17b-1. The tilt face 17b-1 of the optical disk 17b is made of an aluminum coating face.

A key point of the invention is to use frustrating total internal reflection (FTIR) phenomenon generating a penetrating wave which will be evanescent therefrom.

When an incidence angle is larger than a threshold angle, though a total reflection does occur in the incidence wave, an electromagnetic wave is in an area above a border face. The electromagnetic wave is an evanescent wave, and the presence of the evanescent wave can be understood from a permeated electrical field $E_r$.

$$E_r = E_{or} \exp_i (K_i^* r - wt) \quad (1$$

Figure 3:
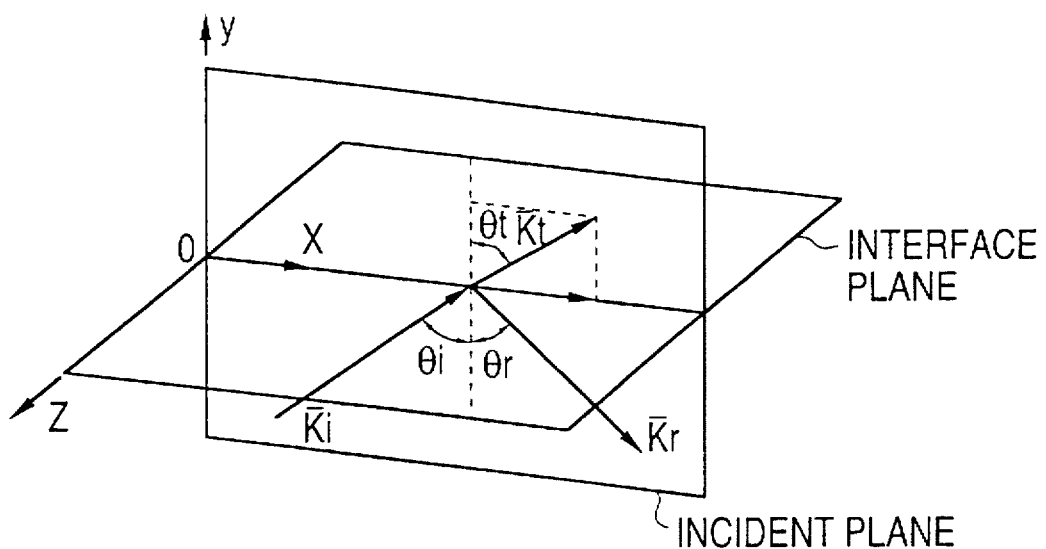
FIG. 3 shows coordinates illustrating a propagation vector of internal reflection.

In the equation, $K_i^* r$ can be expressed as $K_i^* r + K_{rx} X - K_{ry} Y$ as illustrated in FIG. 3, and in this time $K_{rx} = K_r \sin \Theta_r$ and the $K_{ry} = K_r \cos \Theta_r$.

Applying Snell's law, $$\begin{aligned} K_{ty} &= \pm K_t (1 - \sin^2\Theta_i / n_n^2)^{1/2} \\ &= \pm i K_t (\sin^2\Theta_i / n_n^2 - 1)^{1/2} \\ &\equiv \pm i \beta \end{aligned}$$

Accordingly, when $K_1 = K_t \sin \Theta_i / n_n$ $$E_r = E_{or} \exp \mp \beta \exp^{i(K1X - wt)}$$

In this time, when the positive exponential is ignored, as being physically impossible, the amplitude of the evanescent wave becomes drastically low as proceeding to the medium having a low refractive index.

That is, from a plurality of elements of $\exp^{i(K1X - wt)}$, the evanescent wave is shifted in parallel with the border face at a speed of $w/k_i$ and the phase can be expressed with a certain face. Additionally, the phase speed of the evanescent wave is larger than that of the medium having a larger refractive index by $1/\sin\Theta_i$.

Figure 4:
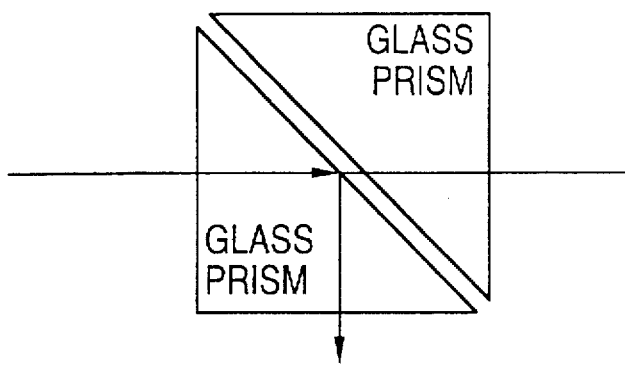
FIG. 4 illustrates a frustrated total internal reflection of an evanescent wave that is incident upon a glass prism having a large refractive index from an atmosphere where light is leaked to a medium having a small refractive index.

FIG. 4 illustrates the frustrating total internal reflection: when the evanescent wave is incident upon the glass prism having a large refractive index, a light is leaked to a medium having a small refractive index. As shown in the drawing, the two prisms of 45°–90°–45° do not meet each other, but are arranged in such manner that their oblique side are opposite to each other.

The invention uses the FTIR phenomenon 80 that a laser beam being incident from a left side, as illustrated in FIG. 4, is not totally reflected as the interval between the two oblique sides becomes narrower, but rather the quantity of permeated light becomes larger. That is, the function of reading out the signal written in the optical disk is enabled by applying the principle between the pit side of the optical disk and a total reflecting side of a prism.

Figure 5:
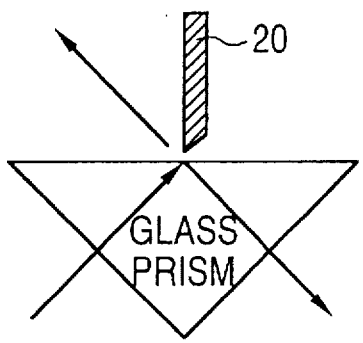
FIG. 5 illustrates a Raman test in which the internal total reflection is frustrated.

FIG. 5 illustrates a Raman test in which the internal total reflection is frustrated. From the results of the test, it is denoted that the reflection is generated from the pointed end of the metal 20 placed near the total reflecting side, thereby being applicable to read out the optical disk.

As described above in more detail, the FTIR phenomenon means that when the evanescent wave proceeds through the medium having a low refractive index to the medium of high refractive index, the energy flows along the space between the two mediums.

An operation of the optical pickup is described with reference to a first embodiment, as illustrated in FIG. 2.

A laser beam departed from the laser diode 15 light source is focused at an oblique side of the perpendicular prism 14a of 45°–90°–45° having the shape, as illustrated in FIG. 4, which causes total reflection at the oblique sides. In case the pit side of the optical disk 17a approaches to the total reflecting side of the prism, the FTIR phenomenon occurs, so that the light amount totally reflected due to the distance difference between the pit side and the total reflecting side is varied according to the concave surface and a convex surface. Thus a totally reflected beam is focused to the photodetector 19 by a light focusing lens 18. Therefore, the varied light amount can be measured. Consequently, the position shifting device 12 is controlled by the position control device 34 to maintain a measured amount of light at a minimum value, therefore, the distance between the convex side and the total reflecting side is maintained at a predetermined distance.

because the pit side is shifted as the optical disk 17a rotates, the light amount varies which is detected by the light amount measuring device 31 and converted into an electrical signal. The electrical signal is converted into a sound or an image through the signal processing device 32 and output through the signal output device 33.

The optical pickup of the invention, as the second preferred embodiment illustrated in FIG. 6, can read out the saw-toothed optical disk 17b and the optical disk having a high writing density.

Figure 7:
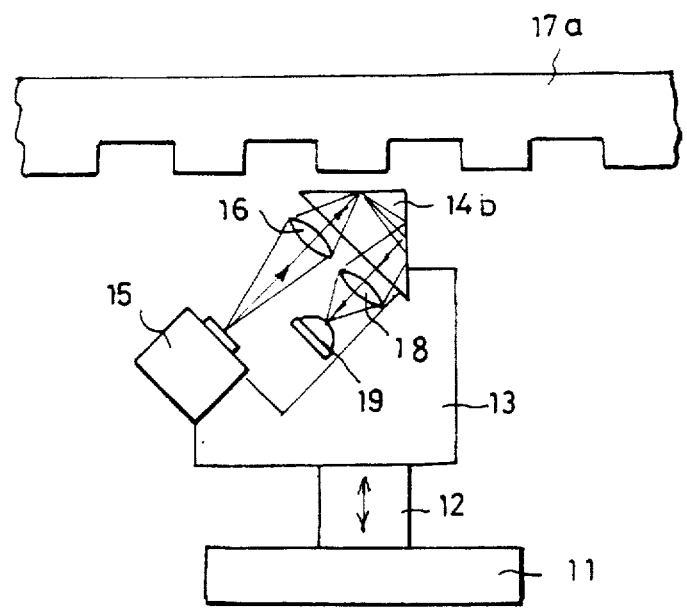
FIG. 7 is a sectional view illustrating a configuration of an optical pickup according to a third embodiment of the invention.

On the other hand, in FIG. 7, an optical pickup configured with another total reflection position of the perpendicular prism of 45°–90°–45° is illustrated as a third embodiment.

As illustrated in FIG. 7, the optical pickup according to the third embodiment of the invention has the position shifting device 12 vertically at a distance in the center part of the second supporting member 11, and the first supporting member 13, which is tetragonal and has an irregular pit on an upper part of a diagonal line, is attached on an upper part of the position shifting device 12. A laser diode is mounted on a lower edge of the upper diagonal line of the second supporting member 13, and a triangle type perpendicular prism 14b of 45°–90°–45° is mounted for whose oblique line to be opposite to the laser diode on the upper edge of the upper diagonal line of the second supporting member 13. And on the same line between the laser diode 15 and the perpendicular prism 14b, the objective lens 16 of the first light focusing means and the light focusing lens 18 of the second light focusing means are mounted separately at regular intervals. The photodetector 19 is arranged between the light focusing lens 18 and the laser diode 15, and the optical disk 17a having a pit side in parallel with one side of the prism is formed on the upper part of the perpendicular prism 14b.

The optical pickup, as illustrated in FIG. 7, can be applied to fabricate the smaller optical element and integrate this kind of optical element in facility.

Figure 8:
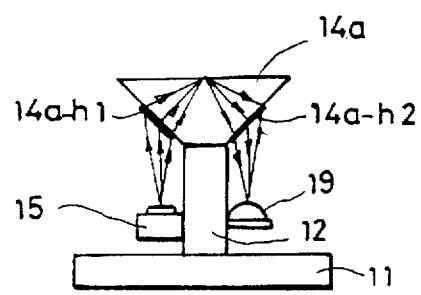
FIG. 8 is a sectional view illustrating a configuration of an optical pickup according to a fourth embodiment of the invention.
Figure 9:
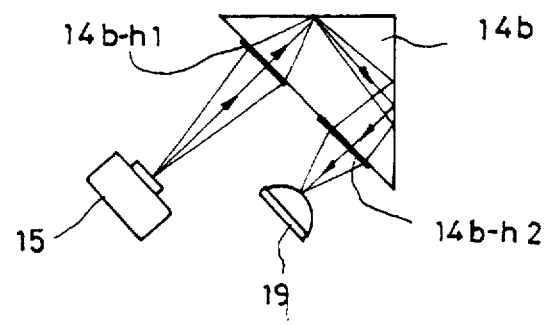
FIG. 9 is a sectional view illustrating a configuration of an optical pickup according to a fifth embodiment of the invention.

As illustrated in FIGS. 8 and 9, the structures of the optical pickups according to the fourth and fifth embodiments aim at the fact the objective lens 16 and the light focusing lens 18 of the first through third embodiments are replaced with the holograms, and the fundamental structure is as follows.

In the fourth embodiment illustrated in FIG. 8, the position shifting device 12 is attached vertically at regular length at the center part of the first supporting member 11, and the reverse-triangle type perpendicular prism 14a of 45°–90°–45° is attached on the position shifting device 12. An objective hologram 14a-h1 is attached to a certain part on the sloping face of the one side of perpendicular prism 14a, and a light focusing hologram 14a-h2 is attached to a certain part on the other sloping face of one side of the perpendicular prism 14a. The laser diode 15 is attached on a certain part of the position shifting device 12 between the first supporting member 11 and the objective hologram 14a-h1 to pass the laser beam through the objective hologram 14a-h1, and the photodetector 19 is attached to a certain part of the position shifting device 12 between the first supporting member 11 and the light focusing hologram 14a-h2 to detect the reflected evanescent wave from the light focusing hologram 14a-h2.

On the other hand, in the fifth embodiment, as illustrated in FIG. 9, the first supporting member 11, the position shifting device 12 and the second supporting member 13 are attached in same manner with the third embodiment, there may be some differences in arranging the perpendicular prism 14b, the laser diode 15 and the photodetector 19 from the fourth embodiment.

That is, the laser diode 15 is attached on the lower edge of the upper diagonal line of the second supporting member 13 and the triangle type perpendicular prism 14b of 45°–90°–45° is formed for whose oblique side to be opposite to the laser diode 15 on the upper edge of the upper diagonal line of the second supporting memberd 13.

The the objective hologram 14b-h1 is attached to a certain part of the oblique side of the perpendicular prism 14b placed in parallel with the laser diode 15 to write the interference pattern of the laser beam from the laser diode 15, and the light focusing hologram 14b-h2 is attached to a certain part of the oblique side of the perpendicular prism 14b placed in parallel with the photodetector 19.

As illustrated in the drawing, in case of applying the fourth and fifth embodiments, to read out the optical disk of high density and to integrate the optical element are possible, thereby enabling the compact optical pickup.

According to the invention as described above, by reading out the signal written in the optical disk with using the frustrating total internal reflection phenomenon, the following effects are enabled: (1) reading out the signal of high density written in the optical disk, (2) maintaining the interval between the optical disk and the optical pickup to be far narrower than the using wave, therefore enabling the writing density to overcome the diffraction limitation, thereby raising the reading-out reliability, (3) integrating of the optical element, thereby, enabling a compact type element.

What is claimed is:

1. An optical pickup apparatus, comprising:
   a light incidence part for focusing light;
   a prism for reflecting said focused light using a total reflecting side of said prism positioned parallel to a writing side of an optical medium;
   a photodetecting part for detecting light reflected from said total reflecting side of said prism; and
   supporting means for supporting said light incidence part, said prism, and said photodetecting part, for controlling horizontal and vertical positions of said light incidence part, said prism, and said photodetecting part, and for maintaining horizontal and vertical intervals between said prism and said optical medium while maintaining a position of said light incidence part and said photodetecting part with respect to said prism.

2. An optical pickup apparatus as defined in claim 1, wherein said light incidence part comprises a laser diode light source, and light focusing means for focusing light output from said light source.

3. An optical pickup apparatus as defined in claim 2, wherein said light focusing means comprises an objective hologram.

4. An optical pickup apparatus as defined in claim 3, wherein said objective hologram is attached to a side of said prism.

5. An optical pickup apparatus as defined in claim 1, wherein said photodetecting part comprises a photodetector, and light focusing means for focusing light being reflected from said total reflecting side of said prism to said photodetector.

6. An optical pickup apparatus as defined in claim 4, wherein said focusing means comprises a focusing hologram.

7. An optical pickup apparatus as defined in claim 6, wherein said focusing hologram is attached to a side of said prism.

8. An optical pickup apparatus as defined in claim 1, wherein said prism is a perpendicular prism having a triangular shape of 45°–90°–45°.

9. An optical pickup apparatus as defined in claim 1, wherein said supporting means comprises:
   a first supporting member;
   a second supporting member for supporting said light incidence part, prism, and photodetecting part; and
   a position shifting device connected to said first supporting member and said second supporting member to maintain the horizontal and vertical intervals between said prism and said optical medium.

10. An optical pickup apparatus as defined in claim 9, wherein said second supporting member is triangular in shape, and has a top portion for supporting said prism and sloping sides for supporting said light incidence part and said photodetecting part.

11. An optical pickup apparatus as defined in claim 1, wherein said supporting means comprises:
    a first supporting member; and
    a position shifting device connected to said first supporting member for controlling the horizontal and vertical positions of said prism to maintain horizontal and vertical intervals between said prism and said optical medium;
    wherein said light incidence part and said photodetecting part are connected to adjacent sides of said position shifting device.

12. An optical pickup comprising:
    a first supporting member;
    a position shifting device attached to said first supporting member;
    a second supporting member being tetragonal and having an irregular pit on an upper part of its diagonal line, said second supporting member being attached to an upper part of said position shifting device;
    a laser diode mounted on a lower edge of the upper diagonal line of said second supporting member;
    a triangular prism attached to said second supporting member, said triangular prism having one side parallel to an optical disk;
    a first light focusing unit formed between said laser diode and said triangular prism;
    a photodetector arranged between said triangular prism and said laser diode; and a second light focusing unit formed between said photodetector and said triangular prism.

13. An optical pickup as defined in claim 12, wherein said first and second light focusing units are comprised of either an objective lens and a light focusing lens or an objective hologram and focusing hologram, respectively.

14. An optical pickup as defined in claim 13, wherein said objective hologram and focusing hologram are both formed on a side of said triangular prism.

15. An optical pickup apparatus as defined in claim 12, wherein internal angles of said triangular prism are 45°–90°–45°.

16. An optical pick-up apparatus for using frustrated total internal reflection to read data information contained on an optical disk having a surface to be read by the optical pick-up apparatus, the apparatus comprising:

a light incidence part for focusing light from a light source;

a prism having a total reflecting side parallel to said optical disk for reflecting said focused light by frustrated total internal reflection;

a photodetecting part for detecting an amount of light reflected from said total reflecting side of said prism and for determining said data information contained on the surface side of said optical disk based on said detected amount of reflected light; and supporting means for supporting and controlling horizontal and vertical positions of said light incidence part, prism, and photodetecting part and for maintaining horizontal and vertical intervals between said optical disk and said prism while maintaining a position of said light incidence part and said photodetecting part with respect to said prism.

17. The apparatus of claim 16, wherein said prism is a perpendicular prism having a triangular shape of 45°–90°–45°.

18. The apparatus of claim 16, wherein said incidence part comprises a laser diode light source and an objective hologram for focusing said light from said light source.

19. The apparatus of claim 16, wherein said photodetecting part comprises a focusing hologram for focusing said reflected light and a photodetector for detecting the amount of light focused by said focusing hologram.

20. The apparatus of claim 19, wherein said photo detecting part further comprises:

a light meter for measuring the amount of light reflected from said total reflecting side of said prism;

a signal processing device for converting the amount of light measured by said light meter into data corresponding to data information encoded on the optical disk.

21. The apparatus of claim 16, wherein said amount of light detected by said photodetecting part is determined by the change in reflectivity of said total reflecting side of said prism.

22. The apparatus of claim 16, wherein said supporting means comprises a position control device for controlling minimal measured light amount by adjusting vertical and horizontal positions of said light incidence part, prism, and photodetecting part.

23. An optical pick-up method for reading data information contained on an optical disk using a light incidence part, a light detecting part, a prism, and a supporting member, comprising the steps of:

focusing light from a light source to a totally reflecting side of a prism parallel to an optical disk;

changing an interval distance between the optical disk and prism by moving a supporting member, a light incidence part, and a light detecting part as a unit;

generating evanescent light from said focused light;

reflecting said focused light from said totally reflecting side of said prism;

changing a reflectivity of said totally reflecting side of said prism by said generated evanescent light; and detecting a changing amount of light reflected from said totally reflecting side due to its changing reflectivity.

* * * * *